US007502924B2

(12) United States Patent
Miller et al.

(10) Patent No.: US 7,502,924 B2
(45) Date of Patent: Mar. 10, 2009

(54) TRANSPARENT ON-DEMAND CERTIFICATE PROVISIONING FOR SECURE EMAIL

(75) Inventors: David J. Miller, Burlington, MA (US); Andrew S. Myers, Wayland, MA (US); John C. Wray, Chelmsford, MA (US)

(73) Assignee: International Business Machines Corporation, Armonk, NY (US)

(*) Notice: Subject to any disclaimer, the term of this patent is extended or adjusted under 35 U.S.C. 154(b) by 860 days.

(21) Appl. No.: 11/042,559

(22) Filed: Jan. 25, 2005

(65) Prior Publication Data

US 2006/0168443 A1 Jul. 27, 2006

(51) Int. Cl.
*H04L 9/00* (2006.01)
(52) U.S. Cl. .................. 713/156; 713/155; 713/150
(58) Field of Classification Search .......... 713/156, 713/155, 150
See application file for complete search history.

(56) References Cited

U.S. PATENT DOCUMENTS

| 6,233,341 B1 | 5/2001 | Riggins |
| 6,393,563 B1 | 5/2002 | Maruyama et al. |
| 6,651,166 B1 | 11/2003 | Smith et al. |

OTHER PUBLICATIONS

Key Exchange (KX)—a next generation protocol to synchronise PGP Keyservers; von Bidder, A.; Weiler, N.; Enabling Technologies: Infrastructure for Collaborative Enterprises, 2003. WET ICE 2003. Proceedings. Twelfth IEEE International Workshops on Jun. 9-11, 2003, pp. 249-254.*

Secure email-based peer to peer information retrieval; Chengye Lu; Geva, S.; Cyberworlds, 2005. International Conference on Nov. 23-25, 2005, p. 8 pp.*

A Case (Study) For Usability in Secure Email Communication Kapadia, Apu; Security & Privacy, IEEE, vol. 5, Issue 2, Mar.-Apr. 2007, pp. 80-84.*

* cited by examiner

*Primary Examiner*—David Y Jung
(74) *Attorney, Agent, or Firm*—Steve Kurlowecz; Hoffman Warnick LLC (57) ABSTRACT

The present invention provides a method, system, and computer program product for transparent on-demand certificate provisioning for secure email. The method comprises: generating a keypair and a self-signed certificate; requesting a certificate from a certification authority; temporarily securing email using the self-signed certificate; and securing email using the requested certificate, after receipt of the requested certificate from the certification authority. The present inventions uses self-signed certificates as an initial, interim security mechanism, provides automatic submission of certificate requests and renewal requests, provides an administrative policy to specify when keypairs and self-signed certificates are generated by a user's client system, and when certificate requests are submitted, and provides automatic transition from end-user defined trust to delegated trust based upon CA-issued certificates.

27 Claims, 6 Drawing Sheets

TRANSPARENT ON-DEMAND CERTIFICATE PROVISIONING FOR SECURE EMAIL

BACKGROUND OF THE INVENTION

1. Field of the Invention

The present invention generally relates to electronic mail (email). More particularly, the present invention provides a method, system, and computer program product for transparent on-demand certificate provisioning for secure email.

2. Related Art

To participate in a secure email exchange, a user must obtain a public/private keypair and a corresponding digital certificate. While a keypair can be automatically generated by the user's client system, obtaining a certificate from a public certification authority (CA) may require significant effort by the end-user. In a managed environment targeted at users who may not have a high degree of technical expertise, such explicit involvement by the end-user is undesirable. As such, there is a need for a way for users to be automatically enabled for secure email (and other security services) in a managed environment, without requiring explicit action by the user.

SUMMARY OF THE INVENTION

In general, the present invention provides a method, system, and computer program product for transparent on-demand certificate provisioning for secure email.

Secure email systems can be divided into two types: those in which trust is delegated using certificates issued by a trusted third-party CA (e.g., conventional Secure Multipurpose Internet Mail Extensions (S/MIME) usage), and those in which trust is determined by the individual end-user (e.g., using Pretty Good Privacy (PGP)). The first type of system is most suitable for business use, where trust is usually determined by corporate affiliation, whereas the second type of system is most appropriate for personal use. The present invention permits the use of end-user determined trust as an interim mechanism in secure email systems of the first type, while a CA-issued certificate is being obtained. It also supports the automatic requesting of a certificate from a CA at an administratively-determined time. In particular, the present invention provides, among other features:

(A) The use of self-signed certificates as an initial, interim security mechanism;
(B) Automatic submission of certificate requests and renewal requests;
(C) An administrative policy to specify when keypairs and self-signed certificates are generated by a user's client system, and when certificate requests are submitted; and
(D) Automatic transition from end-user defined trust to delegated trust based upon CA-issued certificates.

A first aspect of the present invention is directed to a method for certificate provisioning, comprising: generating a keypair and a self-signed certificate; requesting a certificate from a certification authority; temporarily securing email using the self-signed certificate; and securing email using the requested certificate, after receipt of the requested certificate from the certification authority.

A second aspect of the present invention is directed to a system for certificate provisioning, comprising: a system for generating a keypair and a self-signed certificate; a system for requesting a certificate from a certification authority; a system for temporarily securing email using the self-signed certificate; and a system for securing email using the requested certificate, after receipt of the requested certificate from the certification authority.

A third aspect of the present invention is directed to a program product stored on a computer recordable medium for certificate provisioning, the computer readable medium comprising program code for performing the following steps: generating a keypair and a self-signed certificate; requesting a certificate from a certification authority; temporarily securing email using the self-signed certificate; and securing email using the requested certificate, after receipt of the requested certificate from the certification authority.

A fourth aspect of the present invention provides a system for deploying an application for certificate provisioning, comprising: a computer infrastructure being operable to: generate a keypair and a self-signed certificate; request a certificate from a certification authority; temporarily secure email using the self-signed certificate; and secure email using the requested certificate, after receipt of the requested certificate from the certification authority.

A fifth aspect of the present invention provides computer software embodied in a propagated signal for certificate provisioning, the computer software comprising instructions to cause a computer system to perform the following functions: generate a keypair and a self-signed certificate; request a certificate from a certification authority; temporarily secure email using the self-signed certificate; and secure email using the requested certificate, after receipt of the requested certificate from the certification authority.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for transparent on-demand certificate provisioning for secure email. The present invention permits the use of end-user determined trust as an interim mechanism in secure email systems in which trust is delegated using certificates issued by a trusted CA, while a CA-issued certificate is being obtained. It also supports the automatic requesting of a certificate from a CA at an administratively-determined time. In particular, the present invention provides, among other features:

(A) The use of self-signed certificates as an initial, interim security mechanism;
(B) Automatic submission of certificate requests and renewal requests;
(C) An administrative policy to specify when keypairs and self-signed certificates are generated by a user's client system, and when certificate requests are submitted; and
(D) Automatic transition from end-user defined trust to delegated trust based upon CA-issued certificates.

Figure 1:
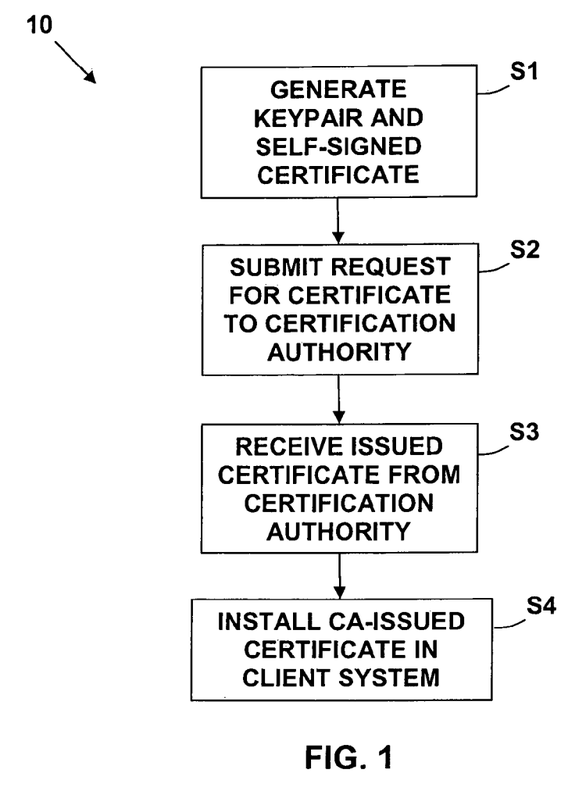
FIG. 1 depicts a flow diagram of a method in accordance with an embodiment of the present invention.

A flow diagram 10 of a method in accordance with an embodiment of the present invention, in which a client system is provisioned for secure email for a specific user, is illustrated in FIG. 1. In step S1, a keypair and a self-signed certificate are generated by a user's client system. In step S2, a request for a certificate is submitted to a CA. While waiting for the certificate to be issued by the CA, the self-signed certificate may be used as interim security mechanism. In step S3, an issued certificate is received from the CA. In step S4, the CA-issued certificate is installed in the client system, replacing the self-signed certificate.

Figure 2:
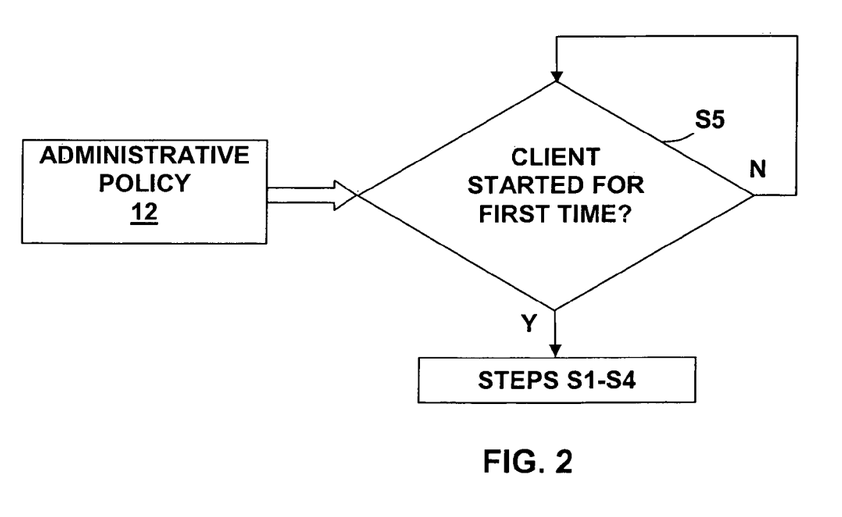
FIGS. 2-4 depict various options for use with the method illustrated in FIG. 1.
Figure 3:
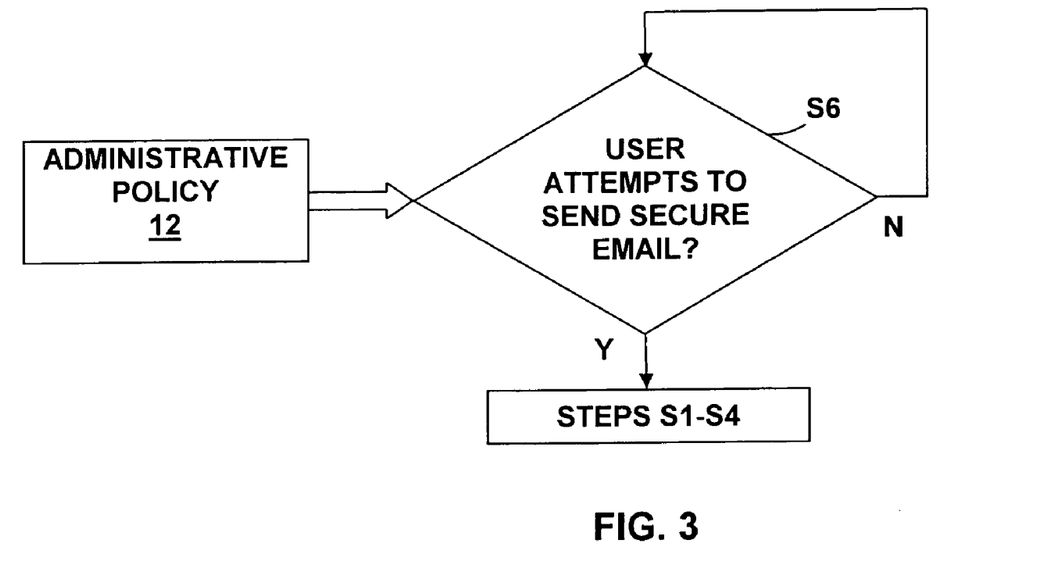
Figure 4:
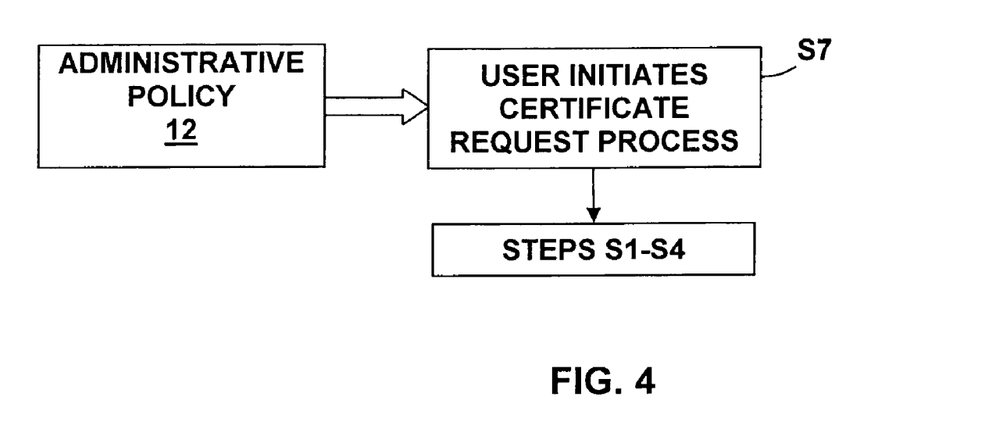

Since one goal of the present invention is to provide a user with secure email capability as transparently as possible, one option provided by the present invention is to perform the above-described steps (i.e., steps S1-S4) the first time the client system is started. This is depicted in step S5 of FIG. 2. However, there may be cost implications of requesting certificates from a commercial CA, so it may be prudent to delay submitting a certificate request until the user attempts to send a secure email. This is depicted in step S6 in FIG. 3. An administrative policy 12 can be used to determine whether certificate requests should be submitted to a CA at client startup (step S5), or delayed until an attempt is made to use secure email (step S6). A further, less transparent option is to allow the user to explicitly initiate the certificate request process as shown in step S7 of FIG. 4. This option would be presented to the user only if permitted by the administrative policy 12. Typically, this option would only be used by a security-aware user.

Figure 5:
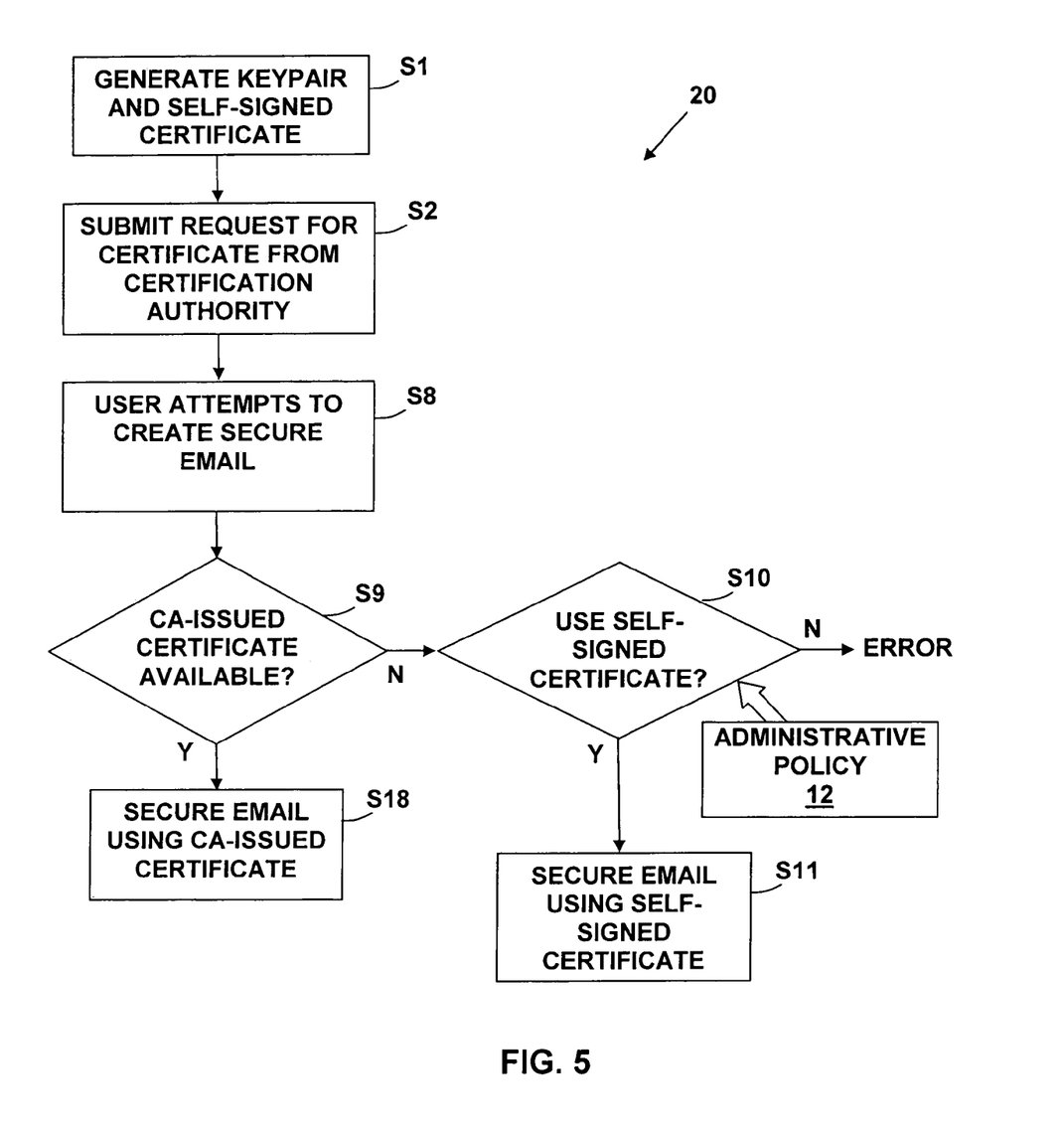
FIG. 5 depicts a flow diagram of a method for using a self-signed certificate as an interim security mechanism in accordance with the present invention.

If the user attempts to create a secure email before the CA-issued certificate is available, the administrative policy 12 is consulted to determine whether the self-signed certificate can be used as an interim security mechanism. This is depicted in the flow diagram 20 of FIG. 5. In step S8, the user attempts to create a secure email. If the requested certificate has not yet been issued by the CA (step S9), then flow passes to step S10, where it decided, based on administrative policy 12, whether the self-signed certificate can be used as an interim security mechanism. If so, the email is secured using the self-signed certificate (step S11). If not, an error results. If the certificate has been issued by the CA (step S9), then flow passes to step S18.

The recipient of an email secured using a self-signed certificate would in general not be able to verify the signature on the email (since the self-signed certificate would not be considered trusted by the recipient); however a receiving system embodying the invention would offer the recipient of the email the opportunity to save the received self-signed certificate and mark it as trusted, so that signatures on subsequently received emails secured using the same self-signed certificate could be verified. This process is depicted in greater detail in the flow diagram 30 illustrated in FIG. 6.

Figure 6:
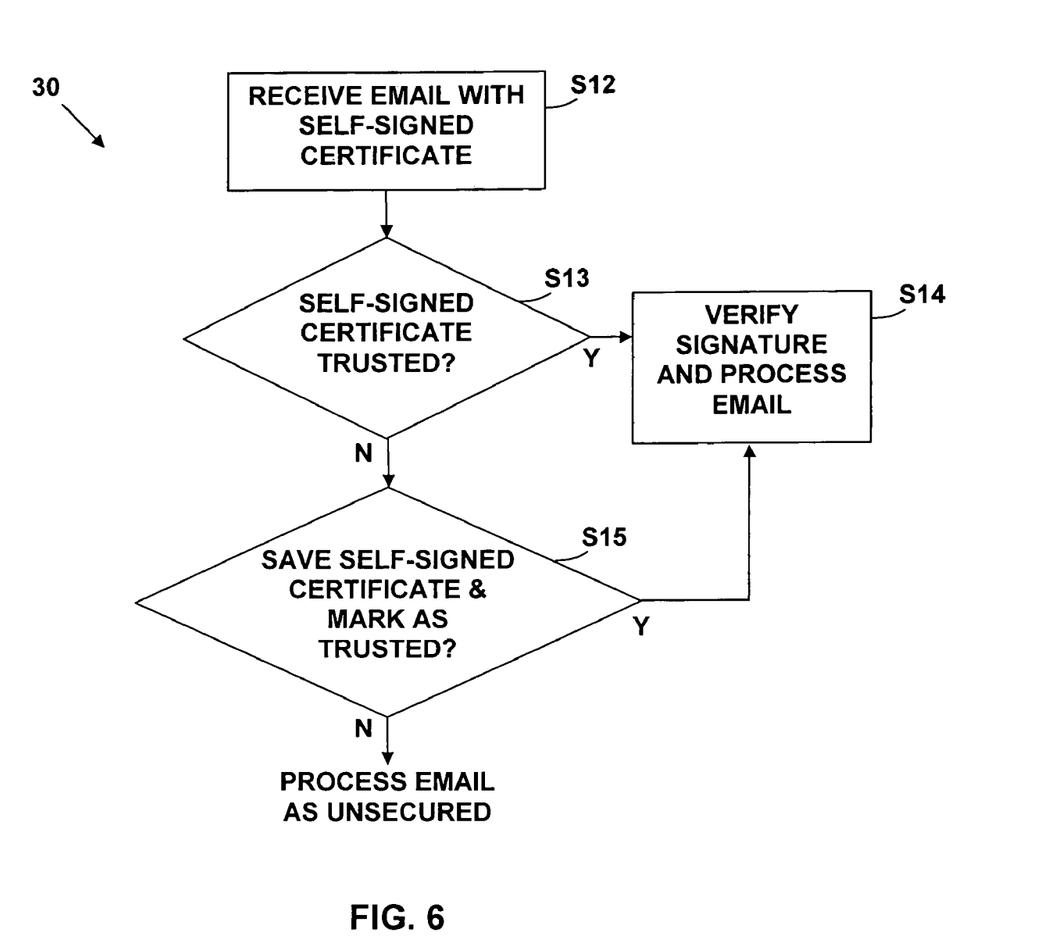
FIG. 6 depicts a flow diagram of a method for processing a received email secured with a self-signed certificate in accordance with an embodiment of the present invention.

In step S12, an email secured using a self-signed certificate is received by a user. In step S13, the trustworthiness of the self-signed certificate is determined. If the self-signed certificate is trusted by the user, then the signature is verified using the self-signed certificate and the email is processed in step S14. If the self-signed certificate is not trusted by the user, then the user is queried in step S15 to save the received self-signed certificate and mark the received self-signed certificate as trusted. If the self-signed certificate is saved and marked as trusted in step S15, then the signature is verified using the self-signed certificate and the email is processed in step S14. Otherwise, the received email is processed as unsecured.

In accordance with an embodiment of the present invention, the self-signed certificate can be annotated (e.g. using a private X.509 extension) by the sender's client system as being an interim certificate. This allows a recipient of an email secured by such a self-signed certificate to treat the self-signed certificate accordingly. For example, a recipient might choose to trust the self-signed certificate only temporarily, with the trust automatically expiring after a predetermined interval, or until the sending user's CA-issued certificate becomes available. This permits a transparent transition from end-user defined trust based upon the use of self-signed certificates, to delegated trust based upon CA-issued certificates.

Figure 7:
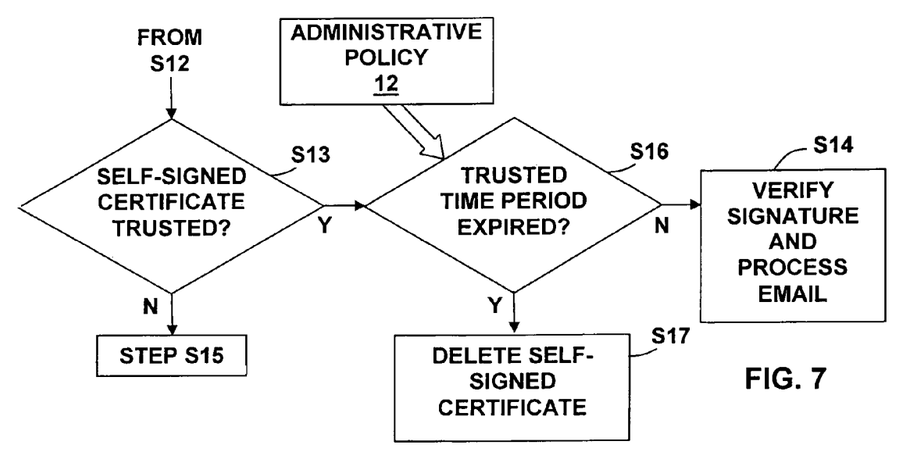
FIG. 7 depicts a flow diagram illustrating the automatic expiration of a self-signed certificate in accordance with an embodiment of the present invention.

An example of the process flow with regard to an automatically expiring self-signed certificate is depicted in FIG. 7. In particular, if a self-signed certificate is considered trusted in step S13, then flow passes to step S16, where the status of the "trusted" time period is determined. The time period can be set by administrative policy 12 or by the user. For example, the time period may comprise the expected length of time required to receive the CA-issued certificate requested in step S2. Other time periods are also possible. If the time period has not expired, the signature is verified in step S14. If the time period has expired, the self-signed certificate is deleted in step S17.

Figure 8:
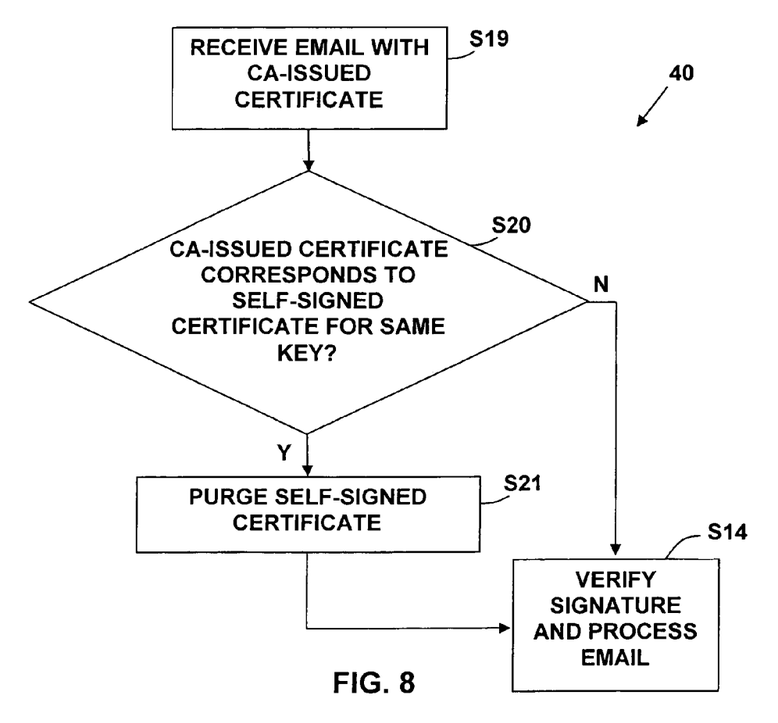
FIG. 8 depicts a flow diagram illustrating the process flow after receipt of a requested CA-issued certificate.

After the CA-issued certificate has been received (step S3) and installed (step S4), the sending user's client system can secure subsequent emails using the CA-issued certificate instead of the self-signed certificate that was temporarily used while awaiting the issuance of the CA certificate. This is illustrated in step S18 of FIG. 5. Further, as shown in the flow diagram 40 of FIG. 8, when an email secured using the CA-issued certificate is received by a user in step S19, and it is determined in step S20 that the CA-issued certificate corresponds to a previously received and "trusted" self-signed certificate for the same key, then the self-signed certificate is purged from the recipient's certificate storage in step S21 and the signature is verified using the CA-issued certificate (step S14).

As stated above, administrative policy governs when (and if) the various steps in the certificate provisioning process of the present invention are performed. The policy options specify, for example:

(A) When a keypair and self-signed certificate are generated (at client startup, when needed or when explicitly requested by the user);
(B) Whether a certification request is automatically submitted to a CA;
(C) Whether a self-signed certificate may be used as an interim security mechanism; and
(D) The temporary trust period for received self-signed certificates.

For example, setting keypair generation to client startup, enabling automatic certification request submission, and disabling the use of self-signed certificates would produce a system that would automatically obtain a certificate from a CA but would not support the use of secure email until the CA-issued certificate is received. A setting of keypair generation at client startup, automatic request submission, and enabling the use of self-signed certificates would also result in a system that will automatically obtain a certificate from a CA, but which could be used in an end-user-defined trust environment in the interim. A setting of keypair generation at startup, disabling submission of certificate requests, and enabling the use of self-signed certificates results in a system that remains with the user-defined trust model. Many other also scenarios are possible.

The administrative policy may be user-specific. For example, users whose organizational role implies a high likelihood of a requirement to exchange secure email could be given a policy that submits certificate requests at client startup, in anticipation of their use, whereas users in a role where secure email is likely to be less useful could be given a policy that delays certification until a need is encountered. When a certificate on the client nears its expiration, certificate renewal may be performed transparently in the same fashion. As with the initial request, administrate policy may specify whether to submit such requests automatically.

Figure 9:
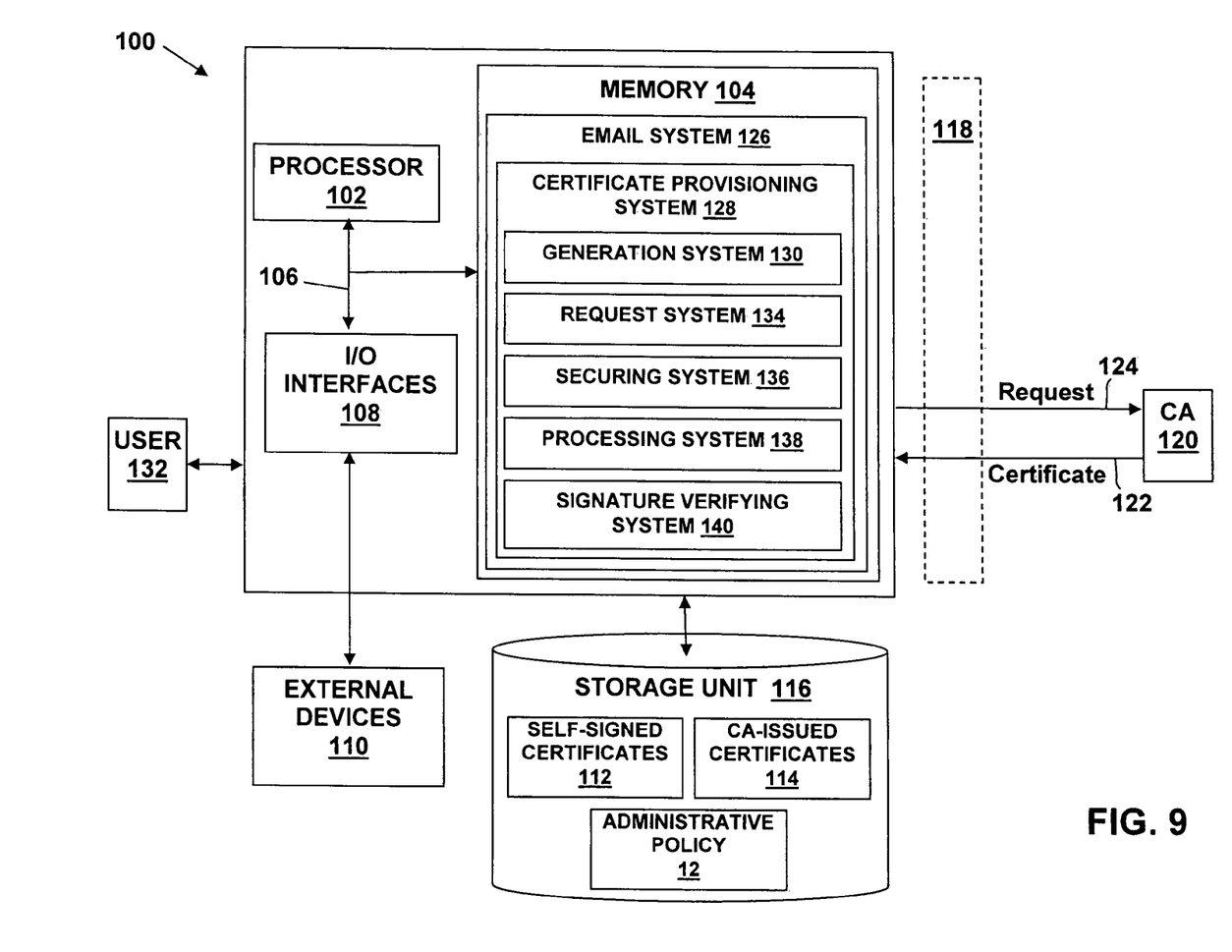
FIG. 9 depicts an illustrative system for implementing the method of the present invention.

A computer system 100 for providing transparent on-demand certificate provisioning for secure email in accordance with an embodiment of the present invention is depicted in FIG. 9. As shown, computer system 100 generally includes a processor 102, memory 104, bus 106, input/output (I/O) interfaces 108 and external devices/resources 110. Processor 102 may comprise a single processing unit, or may be distributed across one or more processing units in one or more locations, e.g., on a client and server. Memory 104 may comprise any known type of data storage and/or transmission media, including magnetic media, optical media, random access memory (RAM), read-only memory (ROM), etc. Moreover, similar to processor 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, handheld device, keyboard, mouse, voice recognition system, speech output system, printer, monitor/display, facsimile, pager, etc.

Bus 106 provides a communication link between each of the components in computer system 100, and likewise may comprise any known type of transmission link, including electrical, optical, wireless, etc. In addition, although not shown, additional components, such as cache memory, communication systems, system software, etc., may be incorporated into the computer system 100.

Data (e.g., self-signed certificates 112, CA-issued certificates 114, administrative policy 12, etc.) used in the practice of the present invention can be stored locally to computer system 100, for example, in storage unit 116, and/or may be provided to computer system 100 over a network 118. Storage unit 116 can be any system capable of providing storage for data and information under the present invention. As such, storage unit 116 may reside at a single physical location, comprising one or more types of data storage, or may be distributed across a plurality of physical systems in various forms. In another embodiment, storage unit 116 may be distributed across, for example, a local area network (LAN), wide area network (WAN) or a storage area network (SAN) (not shown).

Network 118 is intended to represent any type of network over which data can be transmitted. For example, network 118 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Computer system 100 can connect to at least one certification authority (CA) 120 over network 118. Each CA 120 is configured in to provide a CA-issued certificate 122 in response to a certificate request 124 from computer system 100.

Shown in memory 104 is an email system 126 for sending/receiving email. Email system 126 includes a certificate provisioning system 128 for providing transparent on-demand certificate provisioning for secure email in accordance with the present invention, based on administrative policy 12. Certificate provisioning system 128 generally comprises a generation system 130 for generating a keypair and self-signed certificate for a user 132, a request system 134 for requesting a certificate from CA 120, and a securing system 136 for securing sent email messages using a self-signed certificate provided by generation system 130 (e.g., while waiting for a corresponding certificate to be issued by CA 120) and for securing sent email messages using a CA-issued certificate (e.g., when a requested certificate becomes available from CA 120). Certificate provisioning system 128 also includes a processing system 138 for processing incoming self-signed certificates in received emails and a signature verification system 140. The operation of each of these systems is governed by the administrative policy 12.

It should be appreciated that the teachings of the present invention can be offered as a business method on a subscription or fee basis. For example, one or more components of the present invention could be created, maintained, supported, and/or deployed by a service provider that offers the functions described herein for customers. That is, a service provider could be used to provide transparent on-demand certificate provisioning for secure email, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modi-

We claim:

1. A method for certificate provisioning, comprising:
generating a keypair and a self-signed certificate;
requesting a certificate from a certification authority;
temporarily securing email using the self-signed certificate;
securing email using the requested certificate, after receipt of the requested certificate from the certification authority; and
displaying a secure email associated with the requested certificate.

2. The method of claim 1, further comprising:
automatically performing the generating, requesting, and securing steps in response to a starting of a client system.

3. The method of claim 1, further comprising:
automatically performing the generating, requesting, and securing steps in response to a user attempting to send secure email.

4. The method of claim 1, wherein the request for the certificate is explicitly initiated by a user.

5. The method of claim 1, wherein the step of temporarily securing email using the self-signed certificate is performed for a predetermined period of time.

6. The method of claim 5, wherein the predetermined period of time corresponds to an expected length of time required to receive the requested certificate from the certification authority.

7. The method of claim 5, wherein the predetermined period of time is set by an administrative policy.

8. The method of claim 1, further comprising:
determining when the certificate is to be requested from the certification authority, based on an administrative policy.

9. The method of claim 1, further comprising:
receiving an email secured using the self-signed certificate.

10. The method of claim 9, further comprising:
determining if the self-signed certificate in the received email is trusted; and
verifying a signature associated with the self-signed certificate if it is determined that the self-signed certificate is trusted.

11. The method of claim 9, further comprising:
selectively marking the self-signed certificate as trusted for a period of time defined by an administrative policy.

12. The method of claim 9, farther comprising:
receiving an email secured using the certificate received from the certification authority;
determining if the self-signed certificate and the certificate received from the certification authority are associated with a same key; and
purging the self-signed certificate if the self-signed certificate and the certificate received from the certification authority are associated with the same key.

13. Deploying an application for certificate provisioning, comprising:
providing a computer infrastructure being operable to perform the method of claim 1.

14. Computer software embodied in a propagated signal for certificate provisioning, the computer software comprising instructions to cause a computer system to perform the method of claim 1.

15. A system for certificate provisioning, comprising:
at least one computer comprising:
a system for generating a keypair and a self-signed certificate;
a system for requesting a certificate from a certification authority;
a system for temporarily securing email using the self-signed certificate; and
a system for securing email using the requested certificate, after receipt of the requested certificate from the certification authority.

16. The system of claim 15, wherein the system for generating, system for requesting, and system for securing operate automatically in response to a starting of a client system.

17. The system of claim 15, further comprising:
wherein the system for generating, system for requesting, and system for securing operate automatically in response to a user attempting to send secure email.

18. The system of claim 15, wherein the request for the certificate is explicitly initiated by a user.

19. The system of claim 15, wherein the system for temporarily securing email using the self-signed certificate secures email for a predetermined period of time.

20. The system of claim 19, wherein the predetermined period of time corresponds to an expected length of time required to receive the requested certificate from the certification authority.

21. The system of claim 19, wherein the predetermined period of time is set by an administrative policy.

22. The system of claim 15, further comprising:
a system for determining when the certificate is to be requested from the certification authority, based on an administrative policy.

23. The system of claim 15, further comprising:
a system for receiving an email secured using the self-signed certificate.

24. The system of claim 23, further comprising:
a system for determining if the self-signed certificate in the received email is trusted; and
a system for verifying a signature associated with the self-signed certificate if it is determined that the self-signed certificate is trusted.

25. The system of claim 23, further comprising:
a system for selectively marking the self-signed certificate as trusted for a period of time defined by an administrative policy.

26. The system of claim 23, farther comprising:
a system for receiving an email secured using the certificate received from the certification authority;
a system for determining if the self-signed certificate and the certificate received from the certification authority are associated with a same key; and
a system for purging the self signed certificate if the self-signed certificate and the certificate received from the certification authority are associated with the same key.

27. A program product stored on a computer recordable medium for certificate provisioning, the computer readable medium comprising program code, which when executed by a computer, performs the following steps:
generating a keypair and a self-signed certificate;
requesting a certificate from a certification authority;
temporarily securing email using the self-signed certificate; and
securing email using the requested certificate, after receipt of the requested certificate from the certification authority.

* * * * *